H. CARTER.
Harvester Rake.
No. 24,793.
Patented July 19, 1859.
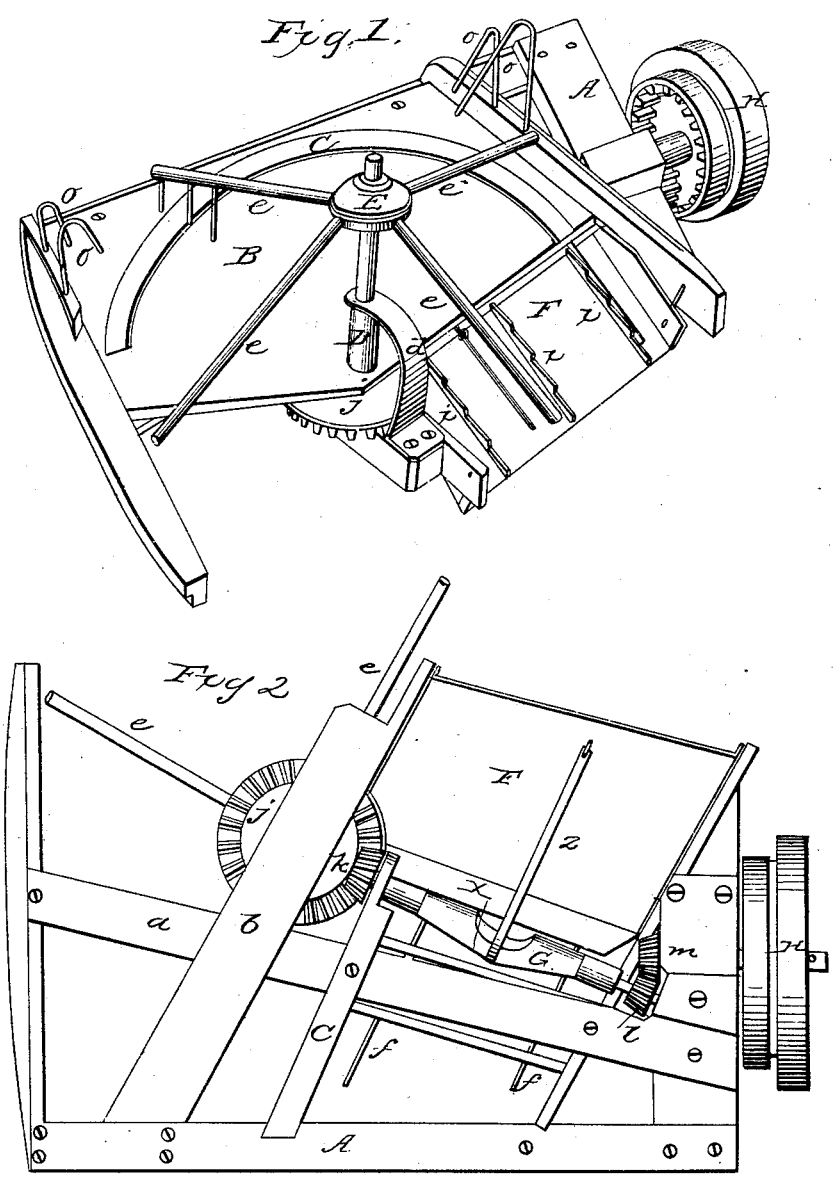
Witnesses:
Edw. F. Brown
James Giles
Inventor:
Heman Carter

UNITED STATES PATENT OFFICE.

HEMAN CARTER, OF GREENE, NEW YORK.

IMPROVEMENT IN HARVESTERS.

Specification forming part of Letters Patent No. 24,793, dated July 19, 1859.

*To all whom it may concern:*

Be it known that I, HEMAN CARTER, of the town of Greene, county of Chenango, in the State of New York, have invented a new and useful Improvement in Automatic Rakes and Dischargers for Grain-Harvesters; and I hereby declare that the following is an exact description of the same, reference being had to the accompanying drawings and the letters thereon, making a part of this specification.

The nature of my invention consists in the arrangement and combination of a vibrating discharger with a horizontally-revolving rake, in the manner hereinafter described.

In order to enable others skilled in the art to make and use my invention, I will describe it in detail.

The letters of reference on the drawings indicate the same parts in the several figures.

Figure 1 shows a top view in perspective. Fig. 2 represents a plan, bottom up.

The frame A, as shown in Fig. 2, is made of timber firmly bolted together. Like other harvesters, the cross-timbers $a\ b\ c$ are framed together diagonally at such angles as to form the support for the bearings of all the machinery to operate the revolving rake and discharger, hereinafter described.

In Fig. 1, B represents the platform on which the grain is lodged after it is cut, and is in a position to receive the action of the rakes as their arms revolve alternately over the platform.

On the platform B, and extending to near the front edge, is a circular elevated track, C, within the radius of the revolving rakes, to enable the grain to move easily to the place where it is discharged by the liberator.

D, as seen in Fig. 1, is a vertical shaft, passing through the platform B near the center of the rear edge, having its bearing on the cross-timber $b$.

On the top of the shaft D is a flange, E, to which the rake-arms $e\ e\ e\ e$ are fastened, they being inclined on an angle of about thirty degrees, and the teeth or forks to remove the grain are made of rolls or pins inserted in the inclined arm $e$. From one to any number of arms may be used requisite to lay the grain in gavels or in a swath. The shaft D is supported in its position by a curved brace, $d$, bolted to the timber $b$. The bent guides $o\ o\ o\ o$ will incline the tops of the grain toward the shaft D as it falls upon the platform.

In the rear of the platform, on one side of the vertical shaft D, is placed the discharger F, which may be made of sheet metal or of wood, and is secured to the under side of the platform by two parallel sliding rods, $f\ f$, and is caused to vibrate laterally by a crank or eccentric, X, on the center of the connecting-shaft G, by means of a pitman, $z$. The discharger F inclines back at an angle of about twenty degrees, the rear edge falling nearly in the plane of the bottom of the driving-wheel H.

On the upper side of the discharger F there are notched bars $i\ i\ i$, which assist to evenly discharge the grain in swaths.

Action is communicated to the rake and discharger by a series of gear-wheels, $j\ k\ l\ m$, deriving their power and motions from the driving-wheel H.

Having thus fully described my invention, what I claim as new, and desire to secure by Letters Patent, is—

The vibrating discharger F, in combination with the rake $e$, arranged and operated in the manner described, for the purposes specified.

HEMAN CARTER.

Witnesses:
EDM. F. BROWN,
JAMES GILES.